United States Patent
Hofmann et al.

(10) Patent No.: US 8,057,104 B2
(45) Date of Patent: Nov. 15, 2011

(54) ANGULAR CONTACT ROLLER BEARINGS, IN PARTICULAR MULTI-ROW BALL ROLLER BEARINGS

(75) Inventors: Heinrich Hofmann, Schweinfurt (DE); Horst Doeppling, Herzogenaurach (DE); Rainer Eidloth, Herzogenaurach (DE); Gottfried Ruoff, Oberwerrn (DE)

(73) Assignee: Schaeffler KG, Herzogenaurach (DE)

( * ) Notice: Subject to any disclaimer, the term of this patent is extended or adjusted under 35 U.S.C. 154(b) by 627 days.

(21) Appl. No.: 12/162,233

(22) PCT Filed: Jan. 16, 2007

(86) PCT No.: PCT/DE2007/000055
§ 371 (c)(1),
(2), (4) Date: Oct. 24, 2008

(87) PCT Pub. No.: WO2007/085227
PCT Pub. Date: Aug. 2, 2007

(65) Prior Publication Data
US 2009/0317030 A1 Dec. 24, 2009

(30) Foreign Application Priority Data

Jan. 26, 2006 (DE) .......................... 10 2006 003 691

(51) Int. Cl.
*F16C 33/34* (2006.01)
*F16C 19/50* (2006.01)
*F16C 19/38* (2006.01)
*F16C 19/56* (2006.01)

(52) U.S. Cl. ......... 384/568; 384/450; 384/604; 384/613

(58) Field of Classification Search .................. 384/450, 384/491, 504, 520, 523, 548, 568, 604, 613
See application file for complete search history.

(56) References Cited

U.S. PATENT DOCUMENTS

| 845,778 | A | * | 3/1907 | Hachfield | 384/544 |
|---|---|---|---|---|---|
| 1,671,372 | A | * | 5/1928 | Leedham | 384/513 |
| 4,741,632 | A | * | 5/1988 | Jacobson | 384/568 |
| 5,065,578 | A | * | 11/1991 | Nakajima et al. | 60/464 |
| 6,612,222 | B2 | * | 9/2003 | Saito et al. | 92/71 |
| 6,769,809 | B2 | * | 8/2004 | Maret | 384/513 |
| 6,824,489 | B2 | * | 11/2004 | Jacob et al. | 384/504 |
| 6,957,919 | B2 | * | 10/2005 | Kern et al. | 384/526 |
| 2008/0166082 | A1 | * | 7/2008 | Hofmann et al. | 384/613 |

FOREIGN PATENT DOCUMENTS

| BE | 365 366 A | 12/1929 |
|---|---|---|
| DE | 331 455 A | 1/1921 |
| DE | 391 950 A | 3/1924 |

(Continued)

*Primary Examiner* — Marcus Charles
(74) *Attorney, Agent, or Firm* — Lucas & Mercanti, LLP

(57) ABSTRACT

The angular contact roller bearing has an outer bearing ring, an inner bearing ring, a plurality of ball rollers arranged between the rings, and a bearing cage. The ball rollers in the two adjacent rows have pressure angle axes extending parallel to one another and are arranged directly one next to the other with their side faces point toward one another. Adjacent ball rollers in the two rows are arranged on a common rotational axis. The ball rollers have diameters and widths which are dimensioned in such a way that envelope cones which form tangents with all the ball rollers at their diameters are arranged with their cone tips precisely at the intersection point of the common rotational axes of the bearing longitudinal axis.

5 Claims, 2 Drawing Sheets

FOREIGN PATENT DOCUMENTS

| | | |
|---|---|---|
| DE | 497 760 A | 5/1930 |
| DE | 43 34 195 A | 3/1994 |
| DE | 10 2005 014556 PA | 10/2006 |
| DE | 102006031956 A1 * | 1/2008 |
| DE | 102006060678 A1 * | 6/2008 |
| GB | 156 523 A | 3/1922 |
| JP | 2003 184885 A | 7/2003 |
| JP | 2007092860 A * | 4/2007 |
| WO | WO 9317251 A1 * | 9/1993 |
| WO | 2007/000149 PX | 1/2007 |

* cited by examiner

ANGULAR CONTACT ROLLER BEARINGS, IN PARTICULAR MULTI-ROW BALL ROLLER BEARINGS

CROSS-REFERENCE TO RELATED APPLICATIONS

This application is a 371 of PCT/DE2007/000055 filed Jan. 16, 2007, which in turn claims the priority of DE 10 22006 003 691.3 filed Jan. 26, 2006. The priority of both applications is hereby claimed and both applications are incorporated by reference herein.

FIELD OF THE INVENTION

The invention relates to an angular contact rolling bearing, and can be realized particularly advantageously in two-row or four-row spherical-roller bearings for supporting shafts or hubs with axial and radial torque loading.

BACKGROUND OF THE INVENTION

It is generally known to a person skilled in the art in the field of rolling bearing technology that shafts or hubs with axial and radial torque loading are usually supported by means of angular contact rolling bearings which, on account of the high loading, are generally formed as two tapered-roller bearings which are inclined with respect to one another and pre-stressed in the axial direction. Said tapered-roller bearings are formed with a large pressure angle in the case of high axial forces and ensure a high level of stiffness of the supported shaft. For optimum bearing kinematics, said tapered-roller bearings are designed structurally such that the longitudinal axis of the tapered rollers is arranged fundamentally at right angles to the respective pressure angle axis, and the cone angle of the tapered rollers and the angle of inclination of the raceways in the bearing rings are dimensioned such that a conical envelope which encompasses the tapered rollers is arranged with its cone tip precisely on that point of the bearing longitudinal axis at which the tapered-roller longitudinal axis also intersects the bearing longitudinal axis. This has the effect that both the tapered rollers and also their raceways are subjected to uniform loading over their entire width.

However, since tapered-roller bearings of said type experience sliding friction between the end surface of the tapered rollers and the guide surface of the bearing rim on account of their preload, as a result of which sliding friction wear occurs on the tapered rollers and on the bearing rim, it has been proposed in DE 198 39 481 A1 to replace the tapered-roller bearings with two-row tandem angular contact ball bearings which can be loaded from one side and which are inclined in an O-arrangement with respect to one another. Said tandem angular contact ball bearings are composed substantially of an outer bearing ring and an inner bearing ring and of a plurality of bearing balls which are arranged between the bearing rings and which are arranged in two rows with different pitch circle diameters adjacent to one another and offset in height and which are held at uniform intervals with respect to one another in the circumferential direction by means of two separate bearing cages for each row. The inner side of the outer bearing ring is formed here with two adjacent groove-shaped raceways which are arranged on common pressure angle axes with two likewise adjacent groove-shaped raceways in the outer side of the inner bearing ring. In each case one row of the bearing balls rolls with their running surfaces on said raceways, with the bearing balls of the row with the larger pitch circle diameter having a greater diameter than the bearing balls of the row with the smaller pitch circle diameter. By using tandem angular contact ball bearings of said type instead of tapered-roller bearings, it is intended here to obtain a significantly reduced friction torque on account of the now eliminated sliding friction between the bearing balls and the raceway shoulders, as a result of which the wear and the temperature of the bearing are reduced and its efficiency is improved.

Such a replacement of tapered-roller bearings with double-row tandem angular contact ball bearings has nevertheless proven to be disadvantageous in practice because said tandem angular contact ball bearings require an increased axial installation space on account of the raceways for the bearing balls being arranged adjacent to one another and on account of the large diameter of the bearing balls in relation to tapered-roller bearings in order to obtain the required load rating. Furthermore, if it is necessary for a tandem angular contact ball bearing of said type to have an even higher load rating than a tapered-roller bearing, complex alterations to the bearing seats are therefore necessary which disadvantageously increase the production costs of the respective component. Furthermore, double-row tandem angular contact ball bearings of said type also entail increased production and material expenditure in relation to tapered-roller bearings during bearing production not least on account of the necessary use of two bearing cages, and therefore the production costs of said double-row tandem angular contact ball bearings are likewise increased. Tandem angular contact ball bearings of said type have also proven to be sub-optimal with regard to bearing kinematics, since the large bearing balls of the two rows which are used result in a conical envelope, which makes contact at a tangent with their diameters, whose cone tip deviates considerably from the point of intersection of the transverse axis, which is at right angles to the pressure angle axis, of two adjacent balls with the bearing longitudinal axis.

To avoid said disadvantages, it has therefore been proposed by the German patent application with the file reference 10 2005 014 556.6, which was not yet published on the filing date of the present patent application, in a double-row angular contact rolling bearing, for the rolling bodies of each row to be formed not as bearing balls but rather as spherical rollers with in each case two side surfaces which are flattened symmetrically from a spherical basic shape and which are arranged parallel to one another, and for two rows with different pitch circle diameters to be arranged adjacent to one another and offset in height, similarly to tandem angular contact ball bearings. Here, the spherical rollers of the row on the larger pitch circle again have, in their spherical basic shape, a larger diameter than the spherical rollers of the row on the smaller pitch circle, and the spherical rollers of the two rows roll with their running surfaces in each case two adjacent groove-shaped raceways in the outer bearing ring and in the inner bearing ring. Here, the raceways of the spherical rollers have pressure angle axes running parallel to one another and are arranged so as to adjoin one another in such a way that the in each case adjacent spherical rollers of each row are arranged directly adjacent to one another with their side surfaces which point toward one another, and guide one another. By using spherical rollers as rolling bodies, it is the intention to distinguish an angular contact rolling bearing of said type from multi-row angular contact ball bearings primarily by a minimized axial and radial installation space, and by an identical or increased load capacity and by the possibility of using a single-part bearing cage for the two rows, while maintaining similar production costs.

However, it has proven to be disadvantageous that the proposed spherical-roller bearing is likewise not yet of optimal design with regard to bearing kinematics, since, as can be clearly seen from FIG. 2 of the patent application, the common transverse axis of in each case two adjacent spherical rollers does not run at right angles to the pressure angle axes of the spherical rollers. A conical envelope which makes contact at a tangent with the two spherical roller diameters would therefore duly lie with its cone tip on the bearing longitudinal axis but would nevertheless deviate horizontally to a considerable extent from the point of intersection of a transverse axis, which runs at right angles to the pressure angle axis, of the two spherical rollers with the bearing longitudinal axis. Here, the oblique alignment of the actual transverse axis of the two adjacent spherical rollers causes those side surfaces of the spherical rollers which point toward one another, and the rotational axes of the spherical rollers, to have a radial offset with respect to one another, as a result of which the spherical rollers do not roll synchronously with respect to one another during bearing operation. This firstly results in friction between the individual spherical roller pairs, and secondly, the bearing cage, as it guides the spherical rollers, is subjected to such a high loading that increased heat is generated and the rolling bodies and bearing cage are subjected to increased wear, and the bearing therefore fails prematurely.

OBJECT OF THE INVENTION

Proceeding from the explained disadvantages of the solutions of the known prior art, the invention is therefore based on the object of designing an angular contact rolling bearing, in particular a multi-row spherical-roller bearing, in which a radial offset of the side surfaces which point toward one another and of the rotational axes of two mutually adjacent spherical rollers is avoided and which is distinguished by spherical rollers which roll synchronously with respect to one another and therefore by reduced wear and increased service life.

DESCRIPTION OF THE INVENTION

According to the invention, this object is achieved in an angular contact rolling bearing such that the adjacent spherical rollers of the two rows are arranged in each case on a common rotational axis, which runs at right angles to the pressure angle axes of the raceways, and have diameters and widths which are dimensioned such that all conical envelopes which make contact with these spherical rollers on their diameters at a tangent are arranged with their cone tips precisely on the point of intersection of the common rotational axes with the bearing longitudinal axis.

The invention is therefore based on the knowledge that the conical envelope bearing kinematics known from tapered-roller bearings represents an optimum for angular contact rolling bearings of all types with regard to bearing load capacity, wear reduction and service life, making it the aim to adapt the previously known multi-row spherical-roller bearings in order to combine their other advantages over tapered-roller bearings with the advantages of conical envelope bearing kinematics.

Accordingly, it is provided in the angular contact rolling bearing that for the determination necessary for obtaining the conical envelope bearing kinematics of the diameter of the spherical rollers arranged on the smaller pitch circle that firstly the spacing of the larger pitch circle to the point of intersection of the common rotational axes with the bearing longitudinal axis must be determined from the function $$l_1 = \frac{0.5 \times T_{K1}}{\sin\alpha}.$$

The initial values necessary for this purpose are known for defined bearing dimensions, since, for the spherical rollers which are arranged on the larger pitch circle, their diameter and their width of 70% of the diameter, and the diameter of the larger pitch circle and of the pressure angles of the bearing are structurally predefined according to the application.

Proceeding from this, it is possible for the conical-envelope kinematics of the angular contact rolling bearing designed according to the invention to be refined in that the diameter for the spherical rollers arranged on the smaller pitch circle can be determined from the function, derived from the theorem on intersecting lines, $$r_2 = \frac{r_1 \times l_1 - 0.7 \times r_1^2}{l_1 + 0.7 \times r_1}.$$

Here, $r_1$ and $r_2$ are in each case half of the diameter of the spherical rollers of the two rows and $l_1$ is the spacing of the larger pitch circle to the point of intersection of the common rotational axes with the bearing longitudinal axis.

A determination of the spacing of the smaller pitch circle to the larger pitch circle on the rotational axes, which are arranged at right angles to the pressure angle axes, of the spherical rollers can also be made according to the invention. For a structurally predefined width of the spherical rollers arranged on the smaller pitch circle of likewise 70% of their diameter, the spacing can be determined by the function $$l_2 = 0.7 \times (r_1 + r_2).$$

Here, the width of the spherical rollers is predefined as at least 70% of their diameter because such a width has been proven in practice with regard to the radial and axial load capacity of the bearing, and corresponds approximately to the contact area which balls of conventional deep-groove ball bearings also have with their raceways in the bearing rings.

Finally, the side surfaces of the spherical rollers of the angular contact rolling bearing are arranged on the smaller pitch circle are smaller than the side surfaces of the spherical rollers arranged on the larger pitch circle, and the side surfaces, which point toward one another, of two adjacent spherical rollers of the two rows have a slight spacing to one another. As a result of the spacing, permanent contact of the adjacent spherical rollers of the two rows is prevented, and thermal expansion of the spherical rollers during bearing operation is allowed for, but at the same time the mutual guidance function of the spherical rollers against tilting movements is maintained.

The angular contact rolling bearing designed according to the invention therefore has the advantage over the angular contact rolling bearings known from the prior art that, as a result of the use of conical envelope bearing kinematics, it no longer has any radial offset between the side surfaces which point toward one another, and between the rotational axes of two adjacent spherical rollers, and the spherical rollers thereby roll synchronously with respect to one another. In this way, the angular contact rolling bearing designed according to the invention is characterized by minimized wear, low cage loading and an increased service life, and combines within it the advantages of conventional tapered-roller bearings and multi-row spherical-roller bearings. Here, the field of use of angular contact rolling bearings designed according to the invention is not restricted only to the double-row application specified by way of example for supporting shafts or hubs with axial and radial torque loading, but rather can also be expanded, by means of a mirror-symmetrical double arrangement directly adjacent to one another, to form four-row applications in the automotive field or the like, as well as many other possible applications.

BRIEF DESCRIPTION OF THE DRAWINGS

One preferred embodiment of the angular contact rolling bearing designed according to the invention is explained in more detail below with reference to the appended drawings, in which.

DETAILED DESCRIPTION OF THE DRAWINGS

Figure 1:
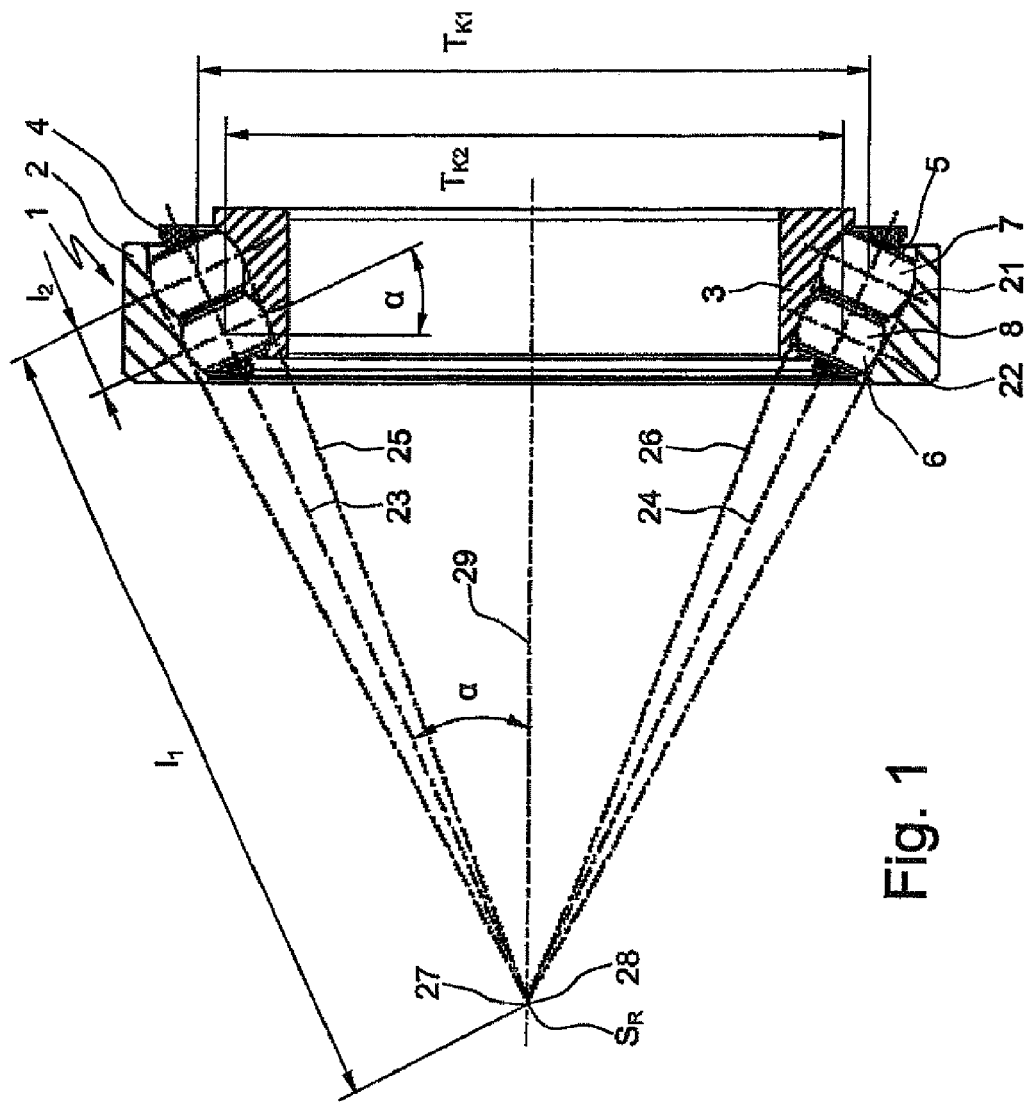
FIG. 1 shows a cross section through an angular contact rolling bearing designed according to the invention.

FIG. 1 clearly shows an angular contact rolling bearing 1 which is designed as a double-row spherical-roller bearing and which is composed substantially of an outer bearing ring 2 and an inner bearing ring 3 and of a plurality of spherical rollers 5, 6 which are arranged between the bearing rings 2, 3 and which are held at uniform intervals with respect to one another in the circumferential direction by means of a bearing cage 4. Said spherical rollers 5, 6 are arranged in two rows 7, 8 with different pitch circle diameters adjacent to one another and offset in height, and, as can be seen from FIG. 2, have in each case two side surfaces 9, 10 and 11, 12 which are flattened symmetrically from a spherical basic shape and which are arranged parallel to one another, with the diameter $d_1$ of the spherical rollers 5 of the row 7 on the larger pitch circle $T_{K1}$ being greater than the diameter $d_2$ of the spherical rollers 6 of the row 8 with the smaller pitch circle $T_{K2}$. Furthermore, the spherical rollers 5, 6 of the two rows 7, 8 roll with their running surfaces 13, 14 in each case two adjacent groove-shaped raceways 17, 18, 19, 20 which are formed in the inner side 15 of the outer bearing ring 2 and in the outer side 16 of the inner bearing ring 3, which raceways 17, 18, 19, 20 have pressure angle axes 21, 22 running parallel to one another and are arranged so as to adjoin one another in such a way that the in each case adjacent spherical rollers 5, 6 of the two rows 7, 8 are arranged directly adjacent to one another with their side surfaces 10, 11 which point toward one another.

New in said angular contact rolling bearing 1 according to the invention is that the adjacent spherical rollers 5, 6 of the two rows 7, 8 are arranged in each case on a common rotational axis 23, 24, which runs at right angles to the pressure angle axes 21, 22, and have diameters $d_1$, $d_2$ and widths $b_1$, $b_2$ which are dimensioned such that all conical envelopes 25, 26 make contact with said spherical rollers 5, 6 on their diameters $d_1$, $d_2$ at a tangent and which are indicated by dash-dotted lines in FIG. 1, are arranged with their cone tips 27, 28 precisely on the point of intersection $S_R$ of the common rotational axes 23, 24 with the bearing longitudinal axis 29.

Here, given defined bearing dimensions, for the spherical rollers 5 arranged on the larger pitch circle $T_{K1}$, the initial values (shown in the drawings) of the diameter $d_1$ and the width $b_1$ of 0.7 $d_1$ of said spherical rollers 5, the diameter of the larger pitch circle $T_{K1}$ and the pressure angle $\alpha$ are structurally predefined, such that, to determine the diameter $d_2$ of the spherical rollers 6 on the smaller pitch circle $T_{K2}$, it is firstly possible from said values to determine the spacing $l_1$ of the pitch circle $T_{K1}$ to the point of intersection $S_R$ of the common rotational axes 23, 24 with the bearing longitudinal axis 29 by the function $$l_1 = \frac{0.5 \times T_{K1}}{\sin\alpha}.$$

Figure 2:
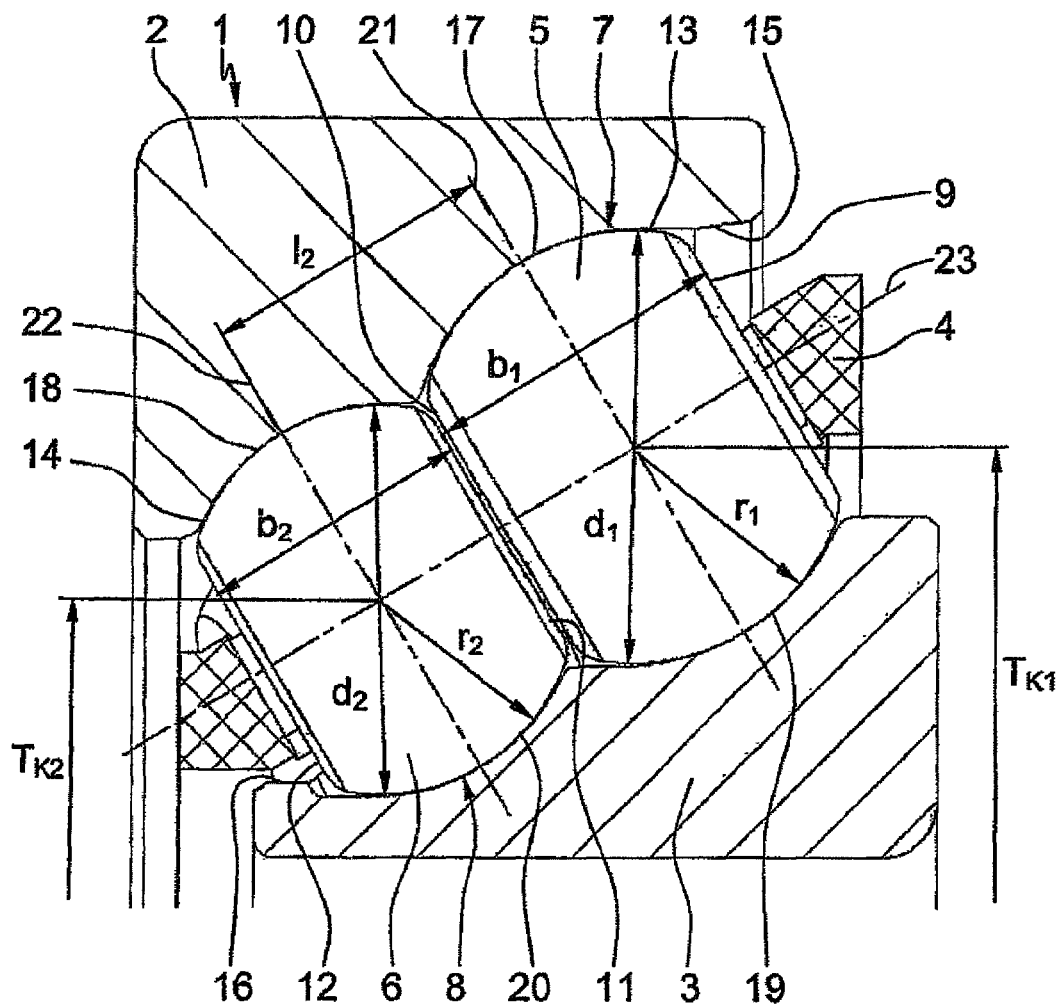
FIG. 2 shows an enlarged illustration of one half of the cross section through an angular contact rolling bearing designed according to the invention.

With the determined spacing $l_1$, it is subsequently possible to determine the diameter $d_2$ for the spherical rollers 6 arranged on the smaller pitch circle $T_{K2}$ from the function $$r_2 = \frac{r_1 \times l_1 - 0.7 \times r_1^2}{l_1 + 0.7 \times r_1},$$

where $r_1$ and $r_2$ are, as indicated in FIG. 2, in each case half of the diameter $d_1$, $d_2$ of the spherical rollers 5, 6 of the two rows 7, 8.

To provide the conical envelope bearing kinematics, it is then possible with the determined diameter $d_2$ for the spherical rollers 6 arranged on the smaller pitch circle $T_{K2}$ to determine the spacing $l_2$ of the smaller pitch circle $T_{K2}$ to the larger pitch circle $T_{K1}$ on the rotational axes 23, 24, which are arranged at right angles to the pressure angle axes 21, 22, of the spherical rollers 5, 6 by the function $$l_2 = 0.7 \times (r_1 + r_2),$$

where the width $b_2$, of 0.7 $d_2$, of the spherical rollers 6 arranged on the smaller pitch circle $T_{K2}$ is likewise structurally predefined.

Finally, it can also be seen from FIG. 2 that the side surfaces 11, 12 of the spherical rollers 6 arranged on the smaller pitch circle $T_{K2}$ are smaller than the side surfaces 9, 10 of the spherical rollers 5 arranged on the larger pitch circle $T_{K1}$, and that the side surfaces 10, 11, which point toward one another in each case, of two adjacent spherical rollers 5, 6 of the two rows 7, 8 have a slight spacing to one another, as a result of which permanent contact of the adjacent spherical rollers 5, 6 of the two rows 7, 8 is prevented, and thermal expansion of the spherical rollers 5, 6 during bearing operation is allowed for.

LIST OF REFERENCE SYMBOLS

| | |
|---|---|
| 1 | Spherical-roller bearing |
| 2 | Outer bearing ring |
| 3 | Inner bearing ring |
| 4 | Bearing cage |
| 5 | Spherical rollers |
| 6 | Spherical rollers |
| 7 | Row |
| 8 | Row |
| 9 | Side surface of 5 |
| 10 | Side surface of 5 |
| 11 | Side surface of 6 |
| 12 | Side surface of 6 |
| 13 | Running surface of 5 |
| 14 | Running surface of 6 |
| 15 | Inner side of 2 |
| 16 | Outer side of 3 |
| 17 | Raceway in 15 |
| 18 | Raceway in 15 |
| 19 | Raceway in 16 |

-continued

| | |
|---|---|
| 20 | Raceway in 16 |
| 21 | Pressure angle axis |
| 22 | Pressure angle axis |
| 23 | Rotational axis |
| 24 | Rotational axis |
| 25 | Conical envelope |
| 26 | Conical envelope |
| 27 | Cone tip |
| 28 | Cone tip |
| 29 | Bearing longitudinal axis |
| $S_R$ | Intersection of 23, 24 with 29 |
| $T_{K1}$ | Larger pitch circle |
| $T_{K2}$ | Smaller pitch circle |
| $d_1$ | Diameter of 5 |
| $d_2$ | Diameter of 6 |
| $b_1$ | Width of 5 |
| $b_2$ | Width of 6 |
| $r_1$ | Radius of 5 |
| $r_2$ | Radius of 6 |
| $\alpha$ | Pressure angle |
| $l_1$ | Spacing from $T_{K1}$ to $S_R$ |
| $l_2$ | Spacing from $T_{K1}$ to $T_{K2}$ |

The invention claimed is:

1. An angular contact rolling bearing for a multi-row spherical-roller bearing, comprising:

an outer bearing ring having two adjacent groove-shaped raceways, which are offset from one another and have running surfaces, formed in an inner side of the outer bearing ring;

an inner bearing ring having two adjacent groove-shaped raceways, which are offset from one another and have running surfaces, formed in an outer side of the inner bearing ring;

a bearing cage; and a plurality of spherical rollers which are arranged between the bearing rings and which are held at an angle at uniform intervals with respect to one another in a circumferential direction by means of the bearing cage, the spherical rollers are arranged in at least two rows, including a first row and a second row, with different pitch circle diameters adjacent to one another and offset in height, and the spherical rollers each have two side surfaces which are flattened symmetrically from a spherical basic shape and which are arranged parallel to one another, the spherical rollers of the first row have a first diameter and a first width and the spherical rollers of the second row have a second diameter, which is smaller than the first diameter of the spherical rollers of the first row, and a second width, the spherical rollers of the first row are arranged on a first pitch circle and the spherical rollers of the second row are arranged on a second pitch circle, the first pitch circle being larger than the second pitch circle, and the raceways have pressure angle axes running parallel to one another and such that the spherical rollers of the two rows are arranged directly adjacent to one another with one of the side surfaces of the spherical rollers of the first row and one of the side surfaces of the second row pointing toward one another, wherein the spherical rollers of the two rows are arranged on a common rotational axis, which runs at right angles to the pressure angle axes, and wherein the diameters and widths of the spherical rollers are dimensioned such that all conical envelopes of said angular contact rolling bearing, which make contact with said spherical rollers on the diameters of the spherical rollers at a tangent, form cone tips and are arranged with the cone tips precisely on a point of intersection of the common rotational axes with a bearing longitudinal axis.

2. The angular contact rolling bearing as claimed in claim 1, wherein for the spherical rollers arranged on the first pitch circle, the first diameter and the first width of $0.7d_1$, and the diameter of the first pitch circle and a pressure angle are structurally predefined such that a spacing of the first pitch circle to the point of intersection of the common rotational axes with the bearing longitudinal axis can be determined by a function $$l_1 = \frac{0.5 \times T_{K1}}{\sin\alpha}.$$

3. The angular contact rolling bearing as claimed in claim 2, wherein the second diameter for the spherical rollers arranged on the second pitch circle can be determined from a function $$r_2 = \frac{r_1 \times l_1 - 0.7 \times r_1^2}{l_1 + 0.7 \times r_1},$$

where $r_1$ and $r_2$ are each half of the first diameter and the second diameter of the spherical rollers of the two rows and $l_1$ is a spacing of the larger pitch circle to the point of intersection of the common rotational axes with the bearing longitudinal axis.

4. The angular contact rolling bearing as claimed in claim 3, wherein the spacing of the second pitch circle to the first pitch circle on the rotational axes, which are arranged at right angles to the pressure angle axes, of the spherical rollers can be determined, for a structurally predefined width, of $0.7d_2$, of the spherical rollers arranged on the second pitch circle, by a function $l_2=0.7\times(r_1+r_2)$.

5. The angular contact rolling bearing as claimed in claim 4, wherein the side surfaces of the spherical rollers arranged on the second pitch circle are smaller than the side surfaces of the spherical rollers arranged on the first pitch circle, and the side surfaces, which point toward one another, of two adjacent spherical rollers of the two rows have a slight spacing to one another.

* * * * *